(12) United States Patent
Hill et al.

(10) Patent No.: US 7,281,514 B2
(45) Date of Patent: Oct. 16, 2007

(54) GLOW RING IGNITION ASSIST FOR INTERNAL COMBUSTION ENGINE

(75) Inventors: Philip G. Hill, Vancouver (CA); Guowei Li, Vancouver (CA); Alan B. Welch, Vancouver (CA); Mark E. Dunn, Vancouver (CA); Dehong Zhang, Vancouver (CA)

(73) Assignee: Westport Power Inc. (CA)

( * ) Notice: Subject to any disclaimer, the term of this patent is extended or adjusted under 35 U.S.C. 154(b) by 0 days.

(21) Appl. No.: 11/098,198

(22) Filed: Apr. 4, 2005

(65) Prior Publication Data

US 2005/0217639 A1 Oct. 6, 2005

Related U.S. Application Data

(63) Continuation of application No. PCT/CA2003/001437, filed on Oct. 2, 2003.

(30) Foreign Application Priority Data

Oct. 2, 2002 (CA) .................................... 2406297

(51) Int. Cl.
*F02B 3/00* (2006.01)
*F02B 3/10* (2006.01)
(52) U.S. Cl. ...................................... 123/298
(58) Field of Classification Search ............... 123/298, 123/145 A, 145 R, 297, 299; 219/270, 541, 219/544
See application file for complete search history.

(56) References Cited

U.S. PATENT DOCUMENTS

| | | | |
|---|---|---|---|
| 3,295,506 A * | 1/1967 | Wisniowski | 123/276 |
| 4,143,262 A * | 3/1979 | Morimitsu et al. | 219/270 |
| 4,399,781 A | 8/1983 | Tsukasaki | |
| 4,620,516 A | 11/1986 | Reum et al. | |
| 4,926,819 A | 5/1990 | Auwarter et al. | |
| 4,939,347 A | 7/1990 | Masaka et al. | |
| 5,144,924 A * | 9/1992 | Paro | 123/275 |
| 5,329,901 A * | 7/1994 | Onishi | 123/254 |
| 5,720,252 A * | 2/1998 | Blodgett et al. | 123/298 |
| 5,915,351 A * | 6/1999 | Regueiro | 123/254 |
| 6,098,588 A * | 8/2000 | Hufnagel | 123/261 |
| 6,336,598 B1 | 1/2002 | Touchette et al. | |
| 6,539,905 B1 * | 4/2003 | Estacio et al. | 123/145 A |

FOREIGN PATENT DOCUMENTS

| | | |
|---|---|---|
| DE | 10052336 A1 | 5/2002 |
| GB | 774948 | 5/1957 |
| GB | 2058217 A | 4/1981 |

* cited by examiner

*Primary Examiner*—Mahmoud Gimie
(74) *Attorney, Agent, or Firm*—McAndrews, Held & Malloy, Ltd.

(57) ABSTRACT

A glow member, preferably in the shape of a ring, assists ignition and combustion of a fuel used in an internal combustion engine. A fuel injection valve injects a plurality of fuel jets directly into a combustion chamber during operation of the engine so that the fuel jets are aimed to the proximity of the glow member such that ignition of fuel in each fuel jet is assisted by the glow member. The glow member is made from high temperature materials and can include catalytic materials to further promote combustion. The glow member can be actively heated, for example by an electric current, in addition to being passively heated by the heat generated within the combustion chamber by the combustion of the fuel therein.

38 Claims, 7 Drawing Sheets

GLOW RING IGNITION ASSIST FOR INTERNAL COMBUSTION ENGINE

CROSS-REFERENCE TO RELATED APPLICATION(S)

This application is a continuation of International Application No. PCT/CA2003/001437, having an international filing date of Oct. 2, 2003, entitled "Glow Ring Ignition Assist for Internal Combustion Engine". International Application No. PCT/CA2003/001437 claimed priority benefits, in turn, from Canadian Patent Application No. 2,406,297 filed Oct. 2, 2002. International Application No. PCT/CA2003/001437 is also hereby incorporated by reference herein in its entirety.

FIELD OF THE INVENTION

The present disclosure relates to an apparatus for assisting ignition and combustion of a fuel used to drive an internal combustion engine.

BACKGROUND OF THE INVENTION

Fuel alternatives to diesel, including gaseous fuels such as natural gas, hydrogen, ethane, and blends of such gaseous fuels, when used to power internal combustion engines, can significantly reduce emissions of pollutants when compared to the same engines fuelled by diesel. Emissions of pollutants such as nitrogen oxides (NOx), particulate matter (PM) and carbon dioxide ($CO_2$) can be reduced when gaseous fuels are used to fuel diesel engines. The amount of such reductions depends on the fuel chosen amongst other variables. Further, diesel engines can be fuelled by gaseous fuel and still maintain the performance found when diesel fuel is used. For example, gaseous fuel directly injected under high pressure into the combustion chamber of a diesel engine can deliver performance that matches its diesel-fuelled counterpart.

Many gaseous fuels and some non-diesel liquid fuels are less auto-ignitable than diesel fuel. As such, conditions within the cylinder may not provide the necessary environment for auto-ignition when the same environment can auto-ignite diesel. Therefore, a method of assisting ignition is needed to ensure the gaseous fuel is ignited.

Injecting a pilot fuel is one method of initiating ignition of a directly injected quantity of gaseous fuel such as natural gas. Typically, a small amount of diesel fuel is added to a compressed intake charge within the combustion chamber when the piston is near top dead center. The diesel fuel auto-ignites. A main quantity of gaseous fuel is then injected. This quantity is ignited by the burning quantity of pilot fuel.

This method requires a source of a second, more auto-ignitable fuel. Therefore, such a system requires separate pilot fuel storage, and specialized fuel injection valve design and piping to manage pilot diesel fuel flow in addition to main fuel flow. Burning diesel fuel in the combustion chamber generates diesel emissions resulting in higher NOx, CO2 and PM levels than would otherwise be present if no pilot diesel fuel is employed.

Alternatively, hot surface or glow plug ignition can be employed to initiate ignition of a gaseous fuel that is directly injected into a compressed intake charge. Here, in general, a glow plug protrudes from the fire deck, a small distance into the combustion chamber. One of several fuel jets injected into the combustion chamber can be directed at the glow plug to initiate combustion of this fuel jet. In turn, this fuel jet, once ignited, will propagate a flame through the combustion chamber in an effort to ignite the other fuel jets.

One of the problems with this method is that the glow plug is a point source of heat within the combustion chamber. Therefore, it takes time for a first ignited fuel jet to propagate a flame throughout the combustion chamber. Additional turbulence may help but can be imperfect. Gas furthest removed from the glow plug may not ignite or may not burn incompletely. As such, the engine may run less efficiently, delivering less power because of incomplete combustion. Also, a higher percentage of unburned fuel can result in increased hydrocarbon (HC) emissions, see: Mueller, C. J. and Musculus, M. P., "Glow Plug Assisted Ignition and Combustion of Methanol in an Optical DI Diesel Engine", SAE paper 2001-01-2004.

Spark ignition can also be used, however, like glow plugs, spark ignition ignites a flame at one point within the combustion chamber that propagates throughout the chamber. Therefore, combustion can be incomplete with this method too.

There is a need to address the problems noted above to improve engine efficiency and to reduce engine emissions.

SUMMARY OF THE INVENTION

The present disclosure introduces a glow member within the combustion chamber that assists in ignition of gaseous fuel and other fuels with a relatively high auto-ignition temperature, compared to diesel fuel. The glow member either initiates combustion or assists in initiating combustion by providing an ignition assist for each of the fuel jets rather than one fuel jet or one region of the chamber. This helps to achieve complete combustion throughout the combustion chamber.

A method is provided for assisting ignition of a fuel within a combustion chamber of an internal combustion engine. The method comprises introducing an intake charge into the combustion chamber during an intake stroke of a piston and compressing the intake charge during a compression stroke of the piston. A plurality of spatially distinct fuel jets is introduced directly into the combustion chamber. At least two distinct fuel jets are directed near or onto a glow member with a surface that is eatable to assist with ignition of the fuel. That is, the at least a portion of the fuel introduced by each one of the fuel jets is directed to respective location within the combustion chamber that is proximate to the heated surface of the glow member so that the heat provided by the glow member assists with the ignition of the fuel, which is burned within the combustion chamber. In a preferred method, the glow member with the hot surface can be in the shape of a ring.

The glow member can be heated by the heat of combustion alone or with additional heat provided by a heating element, powered, for example, by an electric current. A preferred method comprises heating the glow member to a temperature of at least 1200° C.

The method may further comprise stepping down the voltage of said engine's electrical system so that a lower voltage is applied to the heating circuit for the glow member. For example, and engine's electrical system typically operates with a voltage of at least 12 volts, but in a preferred method the voltage applied to the circuit for the heating element of the glow member can be stepped down to less than or equal to 2 volts. An advantage of using a lower voltage is that it allows a material with a lower electrical resistivity to be employed, which can provide more flexibility in selecting heating element materials or to have higher thermal mass, which can result in reduced temperature fluctuations during the course of an engine's operation. A heating element with a larger mass can also be more robust in the severe operating conditions that are normally present within an engine's combustion chamber. In a preferred arrangement, for an engine with a plurality of combustion chambers and a glow member in each combustion chamber, a step down transformer is provided for each glow member and the heating element forms the secondary circuit of the respective step down transformer.

A catalytic coating can be put on the glow member to create conditions where the fuel is ignitable at a lower temperature, compared to the conditions where there is no catalyst present. An advantage of this approach is that heating the glow member, which may comprise a ring, to a lower temperature can improve the durability of the glow member.

A preferred apparatus comprises a glow member disposed within a combustion chamber of an internal combustion engine for assisting combustion of a fuel therein. The glow member provides a eatable surface positioned to assist with the ignition of a plurality of spatially distinct fuel jets injected directly into the combustion chamber. A preferred shape for the glow member is a circular ring.

The glow member can have a surface comprising a catalytic material. The catalytic material can comprise a precious metal. By way of preferred example, the precious metal can be platinum.

The glow member can be connected to a current source for directing an electric current through the glow member. The electric current is capable of heating the glow member. The apparatus can further comprise a transformer for reducing the voltage that is applied to the heating circuit. Vehicles typically use electrical systems based upon a voltage of at least 12 volts. The voltage applied to the glow member heating circuit, could be reduced, for example to less than or equal to 2 volts. By reducing the voltage, the electrical resistance can also be reduced, allowing thicker, more robust heating elements that have a larger thermal mass or the selection of a material with a lower resistivity. The glow member can be subjected to cooling during the engine cycle, for example, when the relatively cool intake charge is introduced into the combustion chamber. A larger thermal mass allows the glow member to retain more heat so there is less variation in the surface temperature of the glow member. In a preferred arrangement of this embodiment, for engines with a plurality of combustion chambers with a glow member in each combustion chamber, a step down transformer is provided for each glow member and the heating element for each glow member is the secondary circuit for the step down transformer.

In some embodiments, the glow member can be capable of being heated to a temperature of at least 1200° C.

A further aspect of the invention provides an internal combustion engine comprising a combustion chamber defined by a cylinder, a piston disposed in the cylinder, the piston oscillating between top dead center and bottom dead center within the cylinder during operation of the engine and a fire deck covering one end of the cylinder opposite to the piston. The engine further includes a fuel injection valve, which is capable of injecting a plurality of spatially distinct fuel jets directly into the combustion chamber. Also, a glow member provides a hot surface that is positioned relative to the fuel injection valve such that a quantity of the fuel from each one of the plurality of fuel jets is eatable by the glow member.

The glow member hot surface can be provided in the shape of a ring.

The engine can be configured so that each one of the plurality of fuel jets impact directly on the glow member.

The glow member can comprise a catalytic material. The catalytic material can comprise a precious metal and in a preferred embodiment, that precious metal can be platinum.

The glow member can comprise an anode and a cathode capable of providing an electric current for heating the glow member. The engine can further comprise a transformer for stepping down the voltage of the electric current from the voltage provided by the engine's electrical system to a lower voltage that can be applied to the glow member. As in previously described embodiments, the voltage applied to the glow member may be less than or equal to 2 volts.

The glow member can further define an orifice and a reservoir. The orifice allows a quantity of the intake charge to flow into and out of the reservoir. When the engine is running, a portion of the intake charge can flow into the reservoir and accumulating therein during a compression stroke. The glow member heats the portion of the intake charge that is held within the reservoir, and during the power stroke the heated portion of the intake charge can flow from the reservoir through the orifices and back into the combustion chamber as a heated "charge jet".

In some embodiments the engine further comprises a barrier disposed within the combustion chamber between the fuel injection valve and the glow member. In this embodiment at least a portion of the fuel that is introduced into the combustion chamber by the plurality of fuel jets impacts on the barrier to generate fuel eddies and the glow member is positioned in a space where the fuel eddies are generated when the engine is operating. The velocity of the fuel in the fuel jets is greater closer to the fuel injection valve, and if the glow member is positioned closer to the fuel injection valve it can be desirable to slow down the fuel that is directed to the glow member so that it has a greater opportunity to ignite. An advantage of this arrangement is that the barrier acts to slow down the fuel and the fuel in the eddies can remain proximate to the glow member for a longer period of time. The barrier is attached to the fire deck. In one embodiment, the barrier can be a spring clip. The glow member can be attached to the barrier for structural support.

The engine can comprise an injection valve sleeve defining an opening for receiving and supporting the fuel injection valve, which is mountable therein. The barrier can be a portion of the sleeve that extends beyond the fire deck so that it protrudes into the combustion chamber. In another embodiment, the barrier can be attached to the injection valve sleeve.

The barrier can comprise a catalytic material that helps to ignite the fuel at a lower temperature, compared to the temperature that would be necessary to ignite the fuel without the presence of the catalytic material. The catalytic material can comprise a precious metal and in a preferred embodiment, the precious metal is platinum.

A further aspect of the invention provides an internal combustion engine comprising a cylinder, a piston disposed within the cylinder where the piston oscillates between top dead center and bottom dead center within the cylinder during operation of the engine. A fire deck covers one end of the cylinder opposite to the piston. The cylinder, the piston and the fire deck substantially define a combustion chamber. The engine includes a fuel injection valve and the fuel injection valve comprises a plurality of orifices, which are provided through a nozzle of the fuel injection valve. The nozzle projects from the fire deck to allow each one of the orifices to direct a fuel into the combustion chamber in a spatially distinct fuel jet. A glow member is positioned suspended from the fire deck and positioned relative to fuel injection valve such that each one of the plurality of fuel jets will impact on the glow member when it is directed into the combustion chamber.

Yet another embodiment of the invention provides an engine comprising a cylinder, a piston disposed in the cylinder where the piston oscillates between top dead center and bottom dead center within the cylinder during operation of the engine. Also, a fire deck is included. The cylinder, the piston and the fire deck substantially define a combustion chamber. Also a fuel injection valve is included where the fuel injection valve comprises at least two orifices. A valve sleeve is included defining a support space and a first end, the first end projected from the fire deck into the combustion chamber. The injection valve is disposed in the support space wherein each of the orifices is capable of directing a fuel jet past the sleeve into the combustion chamber. A glow member is fixed around a clip. The clip is fixed to the first end and positioned on the first end such that a portion of the fuel jets will impact on the clip when injected into the combustion chamber resulting in fuel eddies. The glow member is positioned on the clip such that the eddies impact the glow member.

In preferred embodiments, the fuel that is introduced into the combustion chamber is a gaseous fuel.

Further aspects of the invention and features of specific embodiments of the invention are discussed below.

BRIEF DESCRIPTION OF THE DRAWINGS

In drawings which illustrate non-limiting embodiments of the invention:

FIGS. 1a and 1b show two views of the combustion chamber of a first embodiment wherein a glow member is affixed to the fire deck of the combustion chamber.

FIGS. 2a and 2b show a second embodiment wherein a glow member is affixed to a piston. FIG. 2a shows a top view of the second embodiment and FIG. 2b shows a cross-sectional side view of the second embodiment across line B-B shown in FIG. 2a.

FIGS. 3a, 3b and 3c show three views of a third embodiment of a glow member.

DETAILED DESCRIPTION OF PREFERRED EMBODIMENT(S)

A glow member is provided that assists in ignition and combustion of fuels that are difficult to auto-ignite under the conditions typically found within a compression ignition diesel-fuelled engine. The disclosed method and apparatus help to burn more of the fuel within the combustion chamber.

In the embodiments discussed herein, the combustion chamber has accumulated an intake charge through the piston's intake stroke and has compressed that charge through the piston's compression stroke. The embodiments are demonstrated when the piston is at or near top dead center at the commencement of a power stroke. By way of example, a gaseous fuel is injected into the compressed intake charge within the combustion chamber at about this point in the cycle of the engine. Amongst a number of considerations, the injection should be timed to allow the fuel to ignite and burn to drive the power stroke.

Figure 1A:
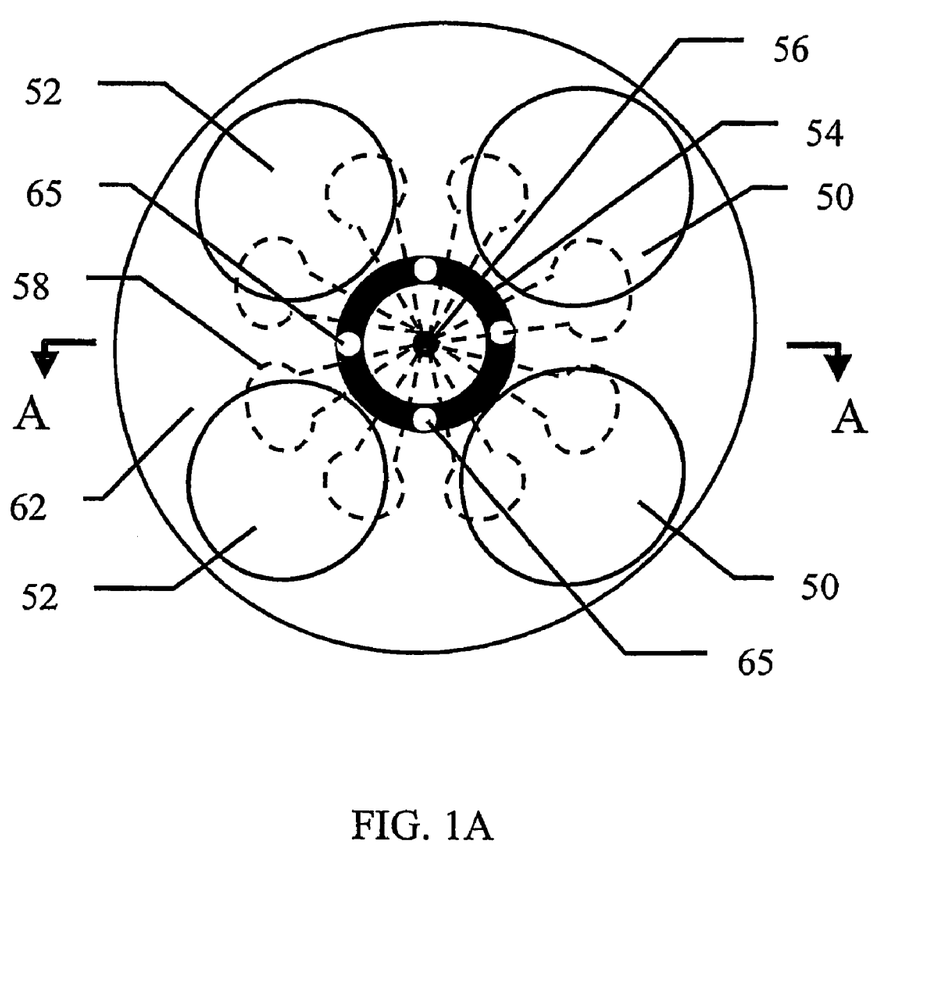
FIG. 1a shows a top view of the combustion chamber demonstrating a preferred position for the subject glow member.
Figure 1B:
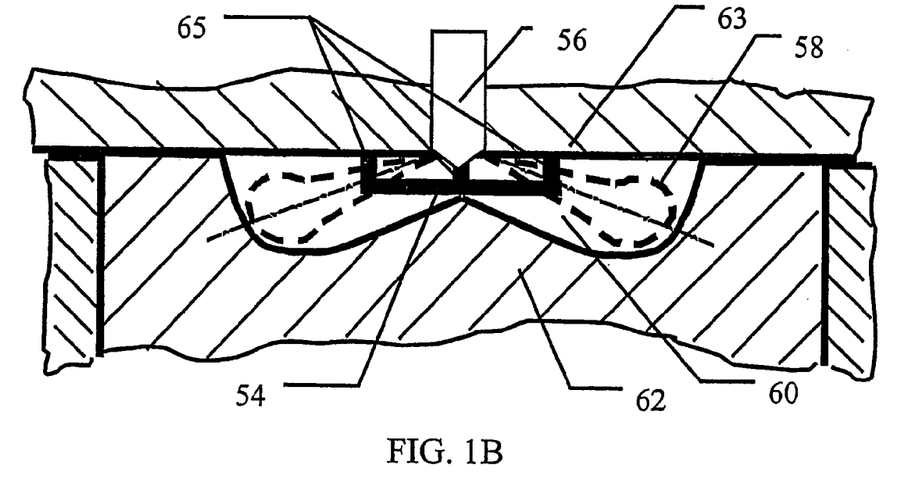
FIG. 1b shows a cross-sectional side view of the combustion chamber across line A-A shown in FIG. 1a, illustrating the glow member attached to the fire deck.

Referring to FIGS. 1a and 1b, ring-shaped glow member 54 is shown attached to fire deck 63.

The first embodiment of the subject disclosure is shown with intake valves 50 and exhaust valves 52 outlined in the top view. Glow member 54, and the nozzle of fuel injection valve 56 are disposed within combustion chamber 60. Dashed lines outline the general shape of fuel jets 58. In FIG. 1b, piston 62 is at or near top dead center within combustion chamber 60. The side view of FIG. 1b also shows fire deck 63 along with posts 65, from which glow member 54 is supported.

Note that fuel jets 58 are shown demonstrating a typical spray pattern within the combustion chamber. FIGS. 1a and 1b show how fuel jets 58 can be directed to the proximity of glow member 54 so that at least a portion of the fuel in fuel jets 58 is heatable by the glow member to assist with igniting the fuel.

Referring to FIG. 1b, glow member 54 is shown affixed to fire deck 63. Glow member 54 is provided in this first embodiment at a distance from fire deck 63 and with a circumference that provides a hot surface area, which assists with ignition and combustion of each fuel jet 58. That is, preferably each fuel jet 58, shortly after being injected into the combustion chamber from fuel injection valve 56, will impact on the upper surface of glow member 54. In turn, glow member 54 imparts heat to at least some of the fuel provided by fuel jets 58 helping to initiate ignition of these fuel jets. That is, as glow member 54 is preferably approximately centered on the fuel injection valve, each fuel jet interacts, and preferably impacts, glow member 54 allowing it to ignite more easily. Combustion is less reliant on flame propagation to ignite and burn all fuel. Therefore, more complete combustion can be achieved.

The disclosure contemplates a fuel injection valve that directs at least two spatially distinct fuel jets into a combustion chamber. That is, the fuel injection valve has a plurality of nozzle orifices, with each orifice providing a point of origin for a fuel jet to direct fuel into the combustion chamber. Each nozzle orifice can direct a fuel jet that is spatially distinct from the fuel jets originating from other respective nozzle orifices. Typically, fuel jets are dispersed from the injection valve tip to various different parts of the combustion chamber to provide fuel to all parts of combustion chamber to help use as much of the intake charge as possible.

The preferred glow member arrangement in the shape of a ring centered on the injection valve allows each fuel jet to impact on the glow member at approximately the same time assuming the injection pressure and injection valve nozzle orifice sizes are the same and symmetry of the fuel jet pattern around the injection valve tip is approximately equal. However, the dimension of the ring can be varied to deal with asymmetric jet patterns. That is, it is preferred, more generally, that the ring be positioned, shaped and dimension such that it would be in the path of each fuel jet directed from the injection valve.

By way of example, the range of dimensioning for the geometry of glow member 54 can be provided by:

$$D = (0.2-0.35) * B$$

$$d = (0.1-0.25) * B$$

$$h = (0.01-0.1) * B$$

where D is the outer diameter of the ring and d the inner diameter of the ring, h is the height of the supporting posts, and B is the diameter of the cylinder.

In preferred embodiments, the diameter of the ring and distance of the ring from the fire deck are selected to help ensure that the glow member is exposed to the combustion environment to help the glow member to accumulate heat during combustion events within the chamber. At the same time, glow member 54 is positioned close enough to the fuel jet that ignition can be assisted.

As would be understood by a person skilled in the art, care should taken to ensure that a glow member with a larger diameter be clear of intake valves 50 and exhaust valves 52, allowing these valves to open as required during operation of the engine.

This first embodiment of the glow member can be "passively" or "actively" heated. As defined herein, a passively heated glow member is made of materials that retain heat between engine cycles. The temperature within the combustion chamber fluctuates during engine operation. For example the temperature drops when the relatively cool intake charge is introduced during the intake stroke, and the temperature increases during the compression stroke and the temperature rises even more during the power stroke when the fuel is burned. A passively heated glow member is made from a material that acts as a "thermal absorber". After being warmed during the first few cycles after start-up, a passively heated glow member can maintain a temperature within a desired range between subsequent combustion events as determined by, amongst other things, the thermal retention and absorption properties of the material and the combustion environment. That is, the combustion environment of a particular fuel will warm the combustion chamber and the passively heated glow member. The heat retained by the glow member allows it to maintain a surface temperature that is hot enough to assist with the ignition of at least a portion of fuel jets 58, which impacts on glow member 54. In this arrangement, the fuel will either ignite and burn as a result of impacting the glow member or ignite and burn more easily than would be the case otherwise. In the later case, another ignition assist strategy can be used in addition to the disclosed glow member, but with less energy being required to ignite the fuel.

A glow member that is only passively heated will be cold if the engine has been shut down for an extended period of time. Therefore, a passively heated glow member requires additional ignition assistance at times when the glow member cannot provide heat to assist with ignition. Therefore, by way of example, a start-up ignition assist such as a glow plug, spark plug or pilot fuel can be used to help initiate ignition of the gaseous fuel until the combustion chamber, and the glow member, is warmed. However, once the engine is "warm", the glow member will impart some heat to the fuel jets. Depending upon the temperature within the combustion chamber and the type of fuel being burned, the amount of assistance from other ignition assistance devices can be reduced or eliminated.

An engine controller may monitor such things as the hydrocarbon emissions, cycle-to-cycle combustion variability and load to help ensure ignition of the fuel, complete combustion of the fuel and a reduction or elimination of a start-up ignition assist such as pilot fuel or a conventional glow plug.

The preferred materials to make glow member 54 are generally high temperature materials of suitable durability to withstand the environment within the combustion chamber. Glow member 54 is made from a material that can withstand the thermal conditions and stresses within the combustion chamber. By way of example, some suitable materials include those considered for glow plugs and glow plug shields. These materials can be coated with catalytic materials such as platinum or other precious metals. U.S. Pat. No. 6,076,493 teaches use and preparation of such materials for a glow plug shield for use in a combustion chamber.

In the disclosed embodiments, ignition assistance is preferably provided by a glow member that can, between cycles, retain a temperature above that found within a given charge at that point near the completion of the compression stroke or the commencement of the power stroke at which time fuel is injected into the combustion chamber.

Note that the shape of the illustrated piston bowl is demonstrative of typical piston bowl designs. Such a design, developed for diesel-fueled engines, is directed at promoting turbulence within the combustion chamber. In the case of glow plug ignition assisted engines, turbulence helps promote the propagation of combustion throughout the combustion chamber. As there is less need for flame propagation within the combustion chamber where the subject teaching is used, such turbulence enhancement geometry within the combustion chamber may be less important than would otherwise be the case.

As already noted, the glow member shown in FIGS. 1a and 1b can also be actively heated. An actively heated glow member is defined as a glow member that does not rely entirely on the absorption of heat from within the combustion chamber for storing heat energy. By way of example, the glow member can be heated by running an electric current through the glow member itself or through an electric heating circuit provided within the glow member.

As an additional feature, any one of the embodiments of the glow member described herein can further comprise one or a plurality of reservoirs provided within the body of a passively or actively heated glow member. Orifices can provide communication between the glow member reservoir(s) and the combustion chamber. A portion of the intake charge that is introduced into the combustion chamber during an intake stroke can accumulate within such reservoir(s) during the intake stroke and the subsequent compression stroke. The intake charge that flows into such reservoir(s) is surrounded by the warmed glow member. Upon commencement of the power stroke, the warmed charge would be expelled into the combustion chamber by the expansion of the combustion chamber, with the warmed charge and the turbulence caused by its re-introduction into the combustion chamber providing further ignition assistance to the fuel.

Known methods can be employed for mounting the glow member within the combustion chamber. For example, in each embodiment it would be appropriate to attach the glow member using appropriate screws, bolts, welding or other known methods, as would be understood by a person skilled in the art.

Figure 2A:
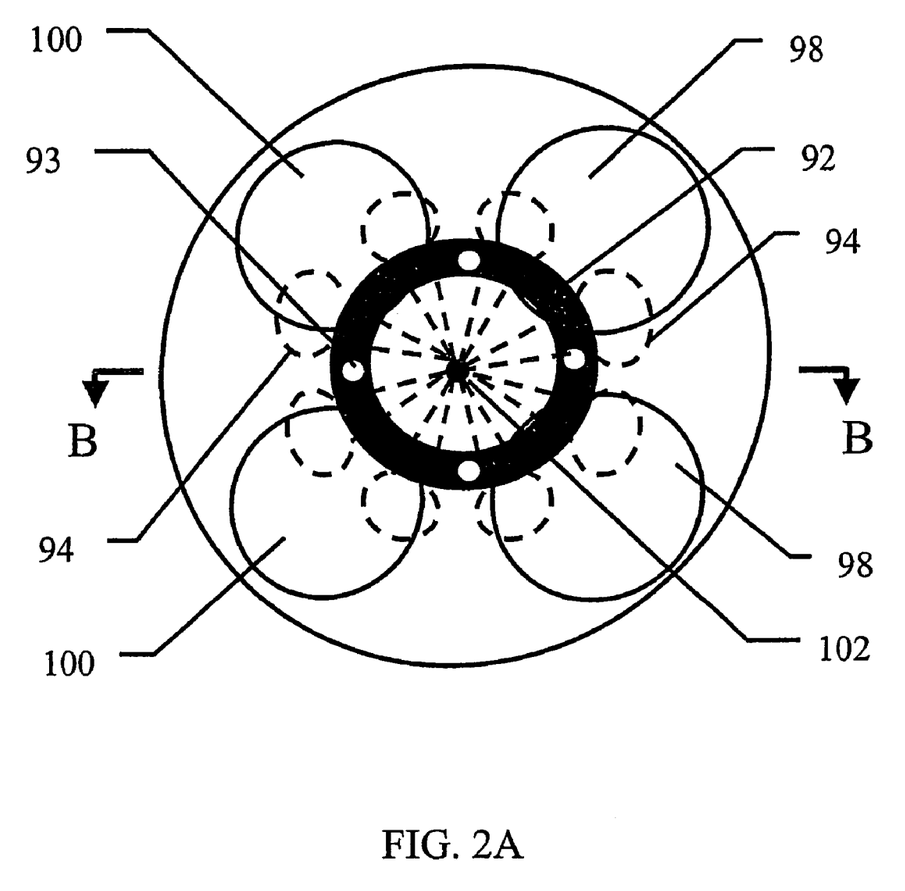
Figure 2B:
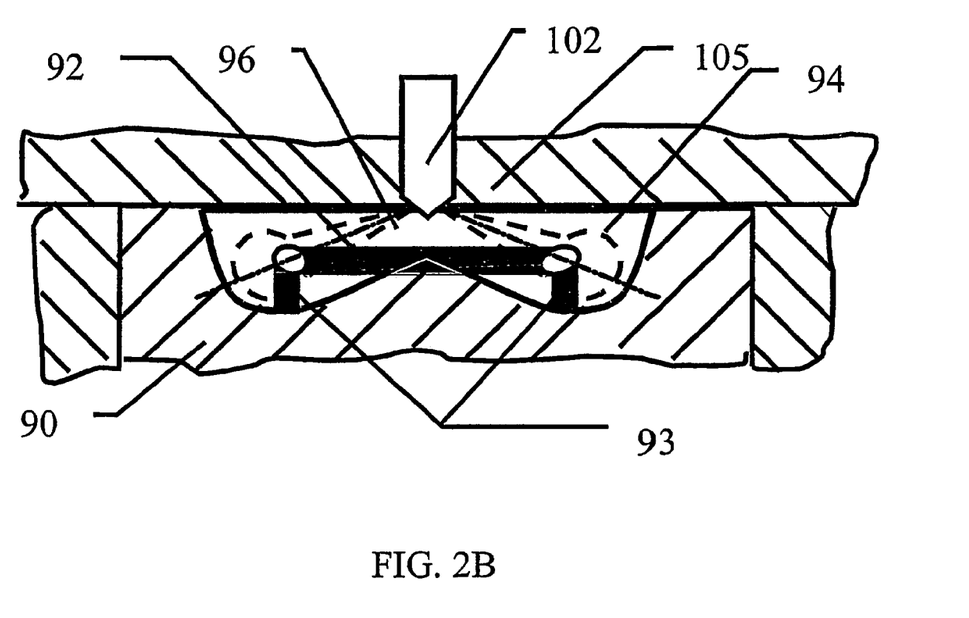

Referring to FIGS. 2a and 2b, a second embodiment is provided. In this embodiment, passive glow member 92 is affixed to piston 90 by posts 93. Again fuel jet 94 is outlined being injected into combustion chamber 96, which is partially defined by piston 90. FIG. 2a shows the location of intake valves 98 and exhaust valves 100. While the illustrated embodiment employs a four-valve arrangement (two intake valves and two exhaust valves), glow member 92 can be employed with a different number of intake or exhaust valves. Also shown by the illustrated embodiment is a combustion chamber with centrally positioned fuel injection valve 102 from which fuel jets 94 originate.

The second embodiment works in generally the same way as the first embodiment. However, as this second embodiment shows the glow member attached to piston 90 instead of fire deck 105, glow member 92 will only come into direct contact with fuel jets 58 when the piston is at or near top dead center. Therefore, it is preferred, for this embodiment, that the fuel be injected near top dead center.

Further, this embodiment has less flexibility adapting an actively heated system to the glow member. It is more difficult to provide the power necessary to an active system because the glow member is attached to the piston.

Figure 3A:
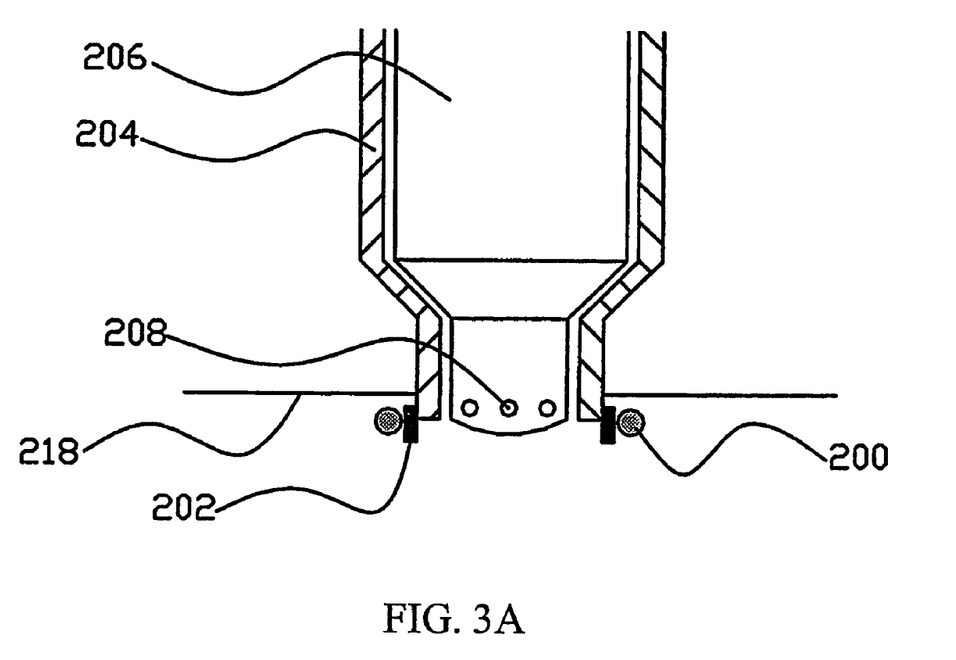
FIG. 3a shows a cross sectional side view of the ring attached to a clip, which in turn is attached to an injector sleeve, which houses a fuel injection valve.
Figure 3B:
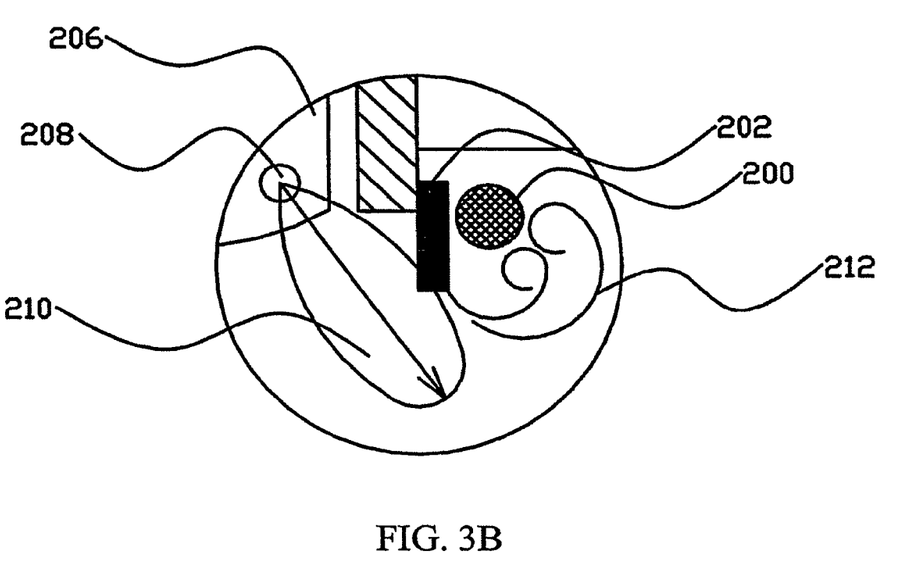
FIG. 3b shows a close up of the circled portion of FIG. 3 a with the outline of a fuel jet stream being ejected from the fuel injection valve.
Figure 3C:
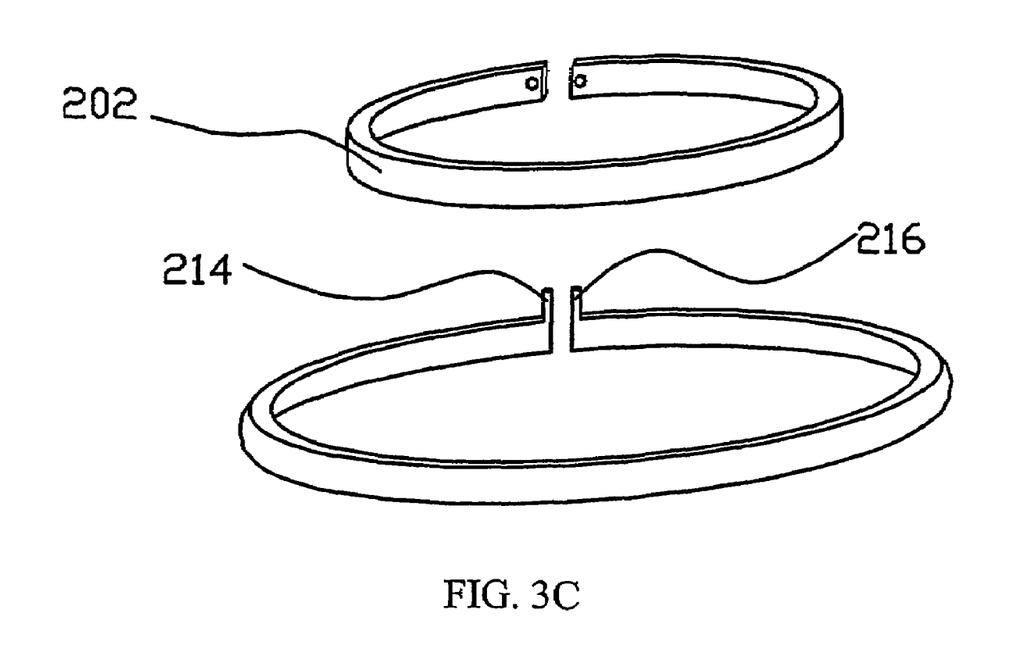
FIG. 3c shows an exploded view of the glow member and clip.

Referring to FIG. 3, a third embodiment is provided wherein an active glow member is shown. Glow member 200 is attached to support member 202, which is, in turn, attached to injection valve sleeve 204. Fuel injection valve 206 is shown mounted inside injection valve sleeve 204. Injection valve nozzle orifices 208 are shown with fuel jets 210. Fuel eddies 212 are shown generated near and beyond support member 202 which acts as a barrier in the path of at least a portion of the fuel jet. Positive and negative power leads 214 and 216 are shown as well. Fire deck 218 defines one boundary of the combustion chamber from which protrudes injection valve 206.

In this preferred embodiment of actively heated glow member 200, support member 202 is attached to an end of injection valve sleeve 204 that extends below fire deck 218 and that projects into the combustion chamber. Glow member 200 is attached to support member 202 as shown, and support member 202 also projects into the combustion chamber. When a controller commands fuel injection valve 206 to open, a quantity of fuel is injected into the combustion chamber, and at least a portion of fuel jets 210 impact on support member 202 to generate fuel eddies 212, which recirculate around support member 202 in the vicinity of glow member 200. Actively heated glow member 200 is heated by an electric current through leads 214 and 216. Therefore, shortly after the fuel eddies are heated by being in the proximity of glow member 200, ignition results. Due to the ring shape of glow member 200 and support member 202, each one of jets 210 from each one of nozzle orifices 208 will generate fuel eddies 212 which can bring fuel close to glow member 200 resulting in ignition of each fuel jet from each eddy. Combustion from the fuel contained in each fuel jet is, likewise, assisted. Further, glow member 200 is relatively small which results in reduced power requirements to heat glow member 200 compared to a larger active glow member.

While it is possible to remove support member 202 and position glow member 200 in the path of fuel jets 210, positioning the glow member directly in the path of fuel jets 210 can inhibit combustion. As fuel jets 210 are driven from fuel injection valve 206 at very high velocity, the fuel can be driven past glow member 200 without igniting. Therefore, support member 202, allows an eddy of fuel to form. It is directed at a relatively low velocity towards the glow member and is allowed to ignite and propagate a flame through to each fuel jet 210.

For this embodiment, the ring should be made of a material capable of being electrically heated to temperatures within the range of 900° C. to 1700° C., with the preferred temperature range between 900° C. and 1200° C. Materials that are able to withstand the conditions found within the combustion chamber are known. For example, suitable materials include $Si_3N_4$ composites. Likewise, support member 202 can be used as a thermal catalyst to promote ignition. It could be made of a thermally absorbing material, such as those discussed above in regards to the passive glow members of the first and second embodiments. When support member 202 is employed as a passive glow member, once heated, it can help reduce the load on active glow member 200.

The disclosed passively and actively heated glow member embodiments can be employed with four-stroke and two-stroke engines.

Conventional glow plugs use a hot surface at a point within the combustion chamber to assist with ignition of a fuel. The present apparatus and method employs a glow member that provides a hot surface that provides ignition and combustion assistance to more than one area of the combustion chamber in cooperation with the fuel injection pattern dictated by fuel injection valve design. Therefore, hot surface geometry that provides ignition and combustion assistance to a plurality of spatially distinct fuel jets also falls within the disclosure. A ring-shaped glow member is a convenient embodiment as many fuel injection valves provide a relatively uniform spray pattern to many regions of a generally cylindrical combustion chamber. However, where the fuel injection valve provides a variation on this spray pattern, the hot surface or "glow element" shape and positioning can be adapted. Therefore, as would be understood by a person skilled in the art, the glow member may be "C"-shaped, oval shaped, or may have other shapes to match the fuel injection valve design.

For the purposes of this disclosure, gaseous fuels are contemplated as the fuel used to drive the engine. However, as suggested above, many fuels that are more difficult to auto-ignite than diesel can, in general, be adapted and are contemplated within the subject disclosure, as would be understood by a person skilled in the art. Therefore, where gaseous fuels are referenced, the disclosure contemplates such fuels as natural gas, methane, ethane, butane, propane and other gaseous hydrocarbon fuels as well as hydrogen and other fuels that contain one or more of these gaseous fuels. Also, some liquid fuels, such as methanol, that can require ignition assistance, depending on engine design, can also benefit. Most such fuels will benefit to some extent from the presence of the disclosed glow member or, more generally, hot surface geometry found in the combustion chamber.

Rate shaping can also be used in the context of this disclosure to help ignite fuel. Greater exposure of a fuel to the glow member, in essence priming the fuel prior to ignition, can help ignition when required during or at the commencement of the power stroke.

While particular elements, embodiments and applications of the present disclosure have been shown and described, it will be understood, of course, that the disclosure is not limited thereto since modifications can be made by those skilled in the art without departing from the scope of the present disclosure, particularly in light of the foregoing teachings.

What is claimed is:

1. A method of assisting ignition of a gaseous fuel within a main combustion chamber of an internal combustion engine, said method comprising:
   a. introducing an intake charge into said main combustion chamber during an intake stroke of a piston, said piston partially defining said main combustion chamber,
   b. compressing said intake charge during a compression stroke of said piston,
   c. injecting a plurality of spatially distinct fuel jets of said gaseous fuel directly into said main combustion chamber,
   d. directing at least two of said plurality of spatially distinct fuel jets proximate to a glow member, said glow member directly igniting said gaseous fuel in at least two spatially distinct locations within said combustion main chamber and proximate to said glow member, each of said at least two locations corresponding to each of said at least two of said plurality of spatially distinct fuel jets, and
   e. burning said gaseous fuel within said main combustion chamber.

2. The method of claim 1 wherein said glow member is in the shape of a ring.

3. The method of claim 1 wherein said glow member is heated by an electric current.

4. The method of claim 3 further comprising heating said glow member to a temperature of at least 1200° C.

5. The method of claim 3 further comprising stepping down the voltage of said engine's electrical system so that a lower voltage is applied to said glow member.

6. The method of claim 5 wherein the voltage applied to said glow member is less than or equal to 2 volts.

7. The method of claim 1 further comprising coating said glow member with a catalytic coating.

8. An apparatus for assisting combustion of a gaseous fuel within a main combustion chamber of an internal combustion engine, said apparatus, comprising a glow member and a fuel injection nozzle positioned within said main combustion chamber, said glow member directly ignites a plurality of spatially distinct, directly injected fuel jets at a plurality of spatially distinct locations within the main combustion chamber.

9. The apparatus of claim 8 wherein said glow member is in the shape of a ring.

10. The apparatus of claim 8 further comprising a catalytic material disposed on a surface of said glow member.

11. The apparatus of claim 10 wherein said catalytic material is a precious metal.

12. The apparatus of claim 11 wherein said precious metal is platinum.

13. The apparatus of claim 8 further comprising first and second electrodes for directing an electric current through said glow member, said electric current capable of heating said glow member.

14. The apparatus of claim 13 wherein a surface of said glow member is heated to a temperature of at least 1200° C.

15. The apparatus of claim 13 further comprising a transformer for stepping down the voltage of said engine's electrical system so that a lower voltage can be applied to said glow member.

16. The apparatus of claim 15 wherein said transformer is capable of stepping down the voltage applied to said glow member to less than or equal to 2 volts.

17. The apparatus of claim 15 wherein a heating element for said glow member is employed as a secondary circuit for said transformer.

18. An internal combustion engine comprising:
   a. a main combustion chamber defined by:
      a cylinder;
      a piston disposed in said cylinder, said piston oscillating between top dead center and bottom dead center within said cylinder during operation of said engine; and
      a fire deck covering one end of said cylinder, opposite to said piston;
   b. a fuel injection valve configured to inject a plurality of spatially distinct fuel jets of a gaseous fuel directly into said main combustion chamber; and
   c. a glow member comprising a hot surface positioned relative to said fuel injection valve such that said gaseous fuel from at least two of said plurality of fuel jets is heated by said glow member to directly ignite said fuel jets proximate to said glow member and in at least two spatially distinct locations within said main combustion chamber.

19. The engine of claim 18 wherein said glow member is in the shape of a ring.

20. The engine of claim 18 wherein said plurality of fuel jets impact directly on said glow member.

21. The engine of claim 18 wherein said glow member comprises a catalytic material.

22. The engine of claim 21 wherein said catalytic material is a precious metal.

23. The engine of claim 22 wherein said precious metal is platinum.

24. The engine of claim 18 wherein said glow member comprises an anode and a cathode capable of providing an electric current for heating said glow member.

25. The engine of claim 24 further comprising a transformer for stepping down the voltage of the electric current from said engine's electrical system so that a lower voltage can be applied to said glow member.

26. The engine of claim 25 wherein said transformer is capable of stepping down the voltage applied to said glow member to less than or equal to 2 volts.

27. The engine of claim 25 wherein a heating circuit for said glow member is employed as a secondary circuit for said transformer.

28. The engine of claim 18 wherein said glow member defines an orifice and a reservoir, said reservoir capable of accumulating and heating a quantity of intake charge during a compression stroke, and said orifice capable of directing a charge jet of said quantity from said orifice into said main combustion chamber during a power stroke.

29. The engine of claim 18 further comprising a barrier disposed within said main combustion chamber between said fuel injection valve and said glow member whereby at least a portion of said fuel introduced into said main combustion chamber by said plurality of fuel jets impacts on said barrier to generate fuel eddies, wherein said glow member is positioned in the space where said fuel eddies are generated when said engine is operating.

30. The engine of claim 29 wherein said barrier is attached to said fire deck.

31. The engine of claim 29 wherein said barrier is a spring clip.

32. The engine of claim 29 wherein said glow member is attachable to said barrier for structural support.

33. The engine of claim 29 further comprising an injection valve sleeve defining an opening for receiving and supporting said fuel injection valve, which is mountable therein, wherein said barrier is attachable to said injection valve sleeve.

34. The engine of claim 29 wherein said barrier comprises a catalytic material.

35. The engine of claim 34 wherein said catalytic material is a precious metal.

36. The engine of claim 35 wherein said precious metal is platinum.

37. The engine of claim 29 further comprising an injection valve sleeve defining an opening for receiving and supporting said fuel injection valve, which is mountable therein, wherein said barrier is provided by a sleeve end that extends beyond said fire deck and into said main combustion chamber.

38. The engine of claim 18 wherein said fuel is a gaseous fuel.

* * * * *